United States Patent [19]
Schmidt

[11] 3,739,820

[45] June 19, 1973

[54] LIQUID SAMPLE COLLECTOR

[76] Inventor: Stanley J. Schmidt, 4146 Flad Avenue, St. Louis, Mo. 63110

[22] Filed: Dec. 17, 1970

[21] Appl. No.: 99,125

[52] U.S. Cl. .................................. 141/284, 23/259
[51] Int. Cl. ............................................. B67c 3/34
[58] Field of Search .......................... 23/252, 259; 141/230, 130, 266, 267, 268, 269, 284, 279

[56] References Cited
UNITED STATES PATENTS

| | | | |
|---|---|---|---|
| 3,124,173 | 3/1964 | Tiffany | 141/284 |
| 3,208,485 | 9/1965 | Tiffany | 141/284 |
| 3,192,968 | 7/1965 | Baruch et al. | 141/284 |
| 3,598,161 | 8/1971 | Baldwin | 141/284 |

Primary Examiner—Houston S. Bell, Jr.
Attorney—William R. Price

[57] ABSTRACT

Discloses a mechanically operated automatic liquid sample collector capable of collecting uniform liquid samples of between 10 and 100 milliliters in size from a dripping column. The automatic liquid sample collector makes use of a rotatable liquid receiving and dispensing mechanism in the form of a delivery arm and a balance arm which rotates and delivers samples to successive test tubes in a non-rotatable test tube rack. This is accomplished by a pin means having a spatial relation to said test tube openings, a positioning and detent means for positioning and detaining said delivery arm over said successive test tubes and an escapement means to allow said positioning means to disengage from said pin means.

5 Claims, 9 Drawing Figures

PATENTED JUN 19 1973
3,739,820
SHEET 1 OF 3
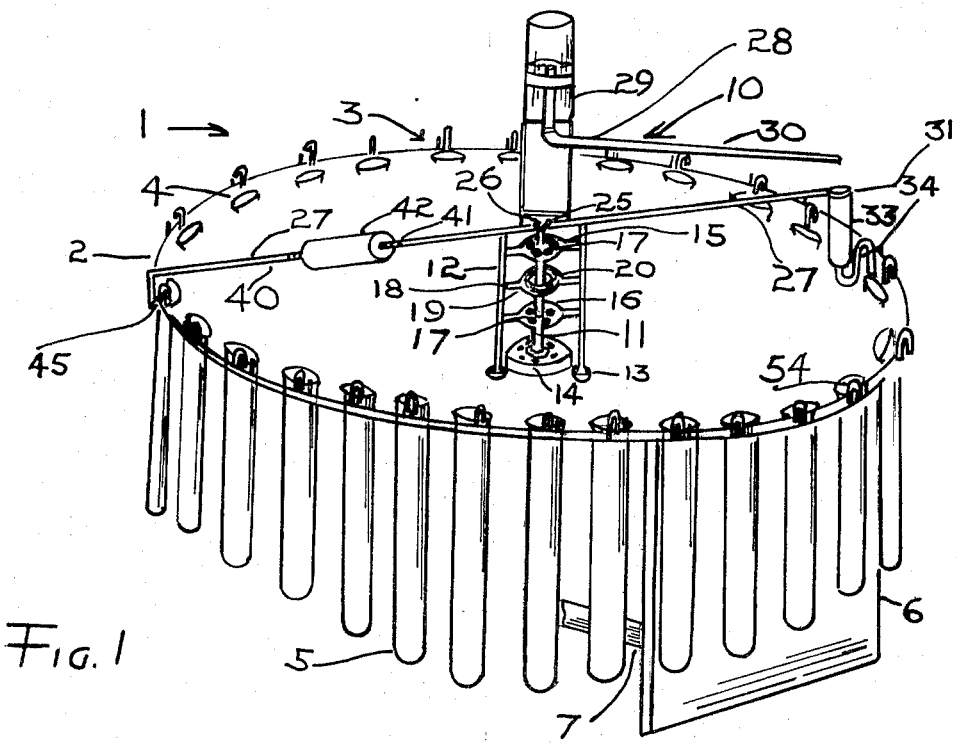
Fig. 1
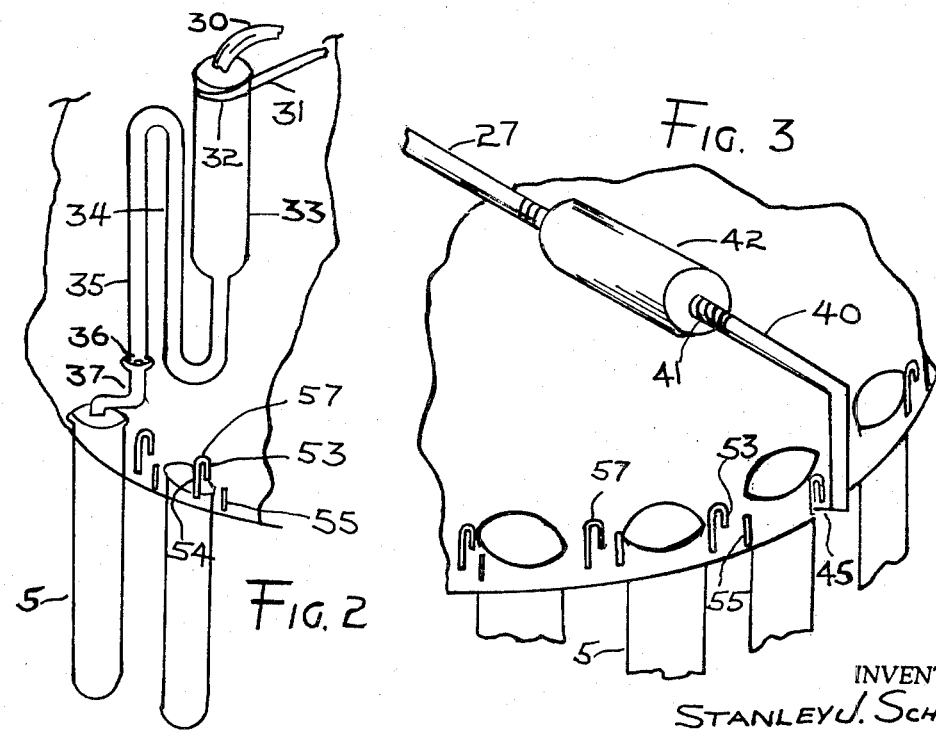
Fig. 2
Fig. 3
INVENTOR.
STANLEY J. SCHMIDT
BY
Wm. R. Price
ATTORNEY INVENTOR,
STANLEY J. SCHMIDT
BY
Wm. R. Price
ATTORNEY INVENTOR
Stanley J. Schmidt
BY Wm. R. Price
ATTORNEY

LIQUID SAMPLE COLLECTOR

FIELD OF THE INVENTION

This invention relates to improvements in apparatus for automatically collecting successive liquid samples of uniform size. More specifically this invention relates to an improved apparatus having a rotatable liquid receiving and dispensing mechanism which rotates to sequentially deliver liquid samples of identical volume to a ring of test tubes in a non-rotatable test tube rack.

DESCRIPTION OF THE PRIOR ART

Many times, in the field of organic chemistry, a large number of samples of identical size are required. This may, involve in many instances, several hundred samples. Previously, a siphon tube has been utilized to deliver samples successively to test tubes held in a rotatable test tube rack. The siphon tube comprises a receiving chamber which communicates with an inverted U tube. The ascending leg of the U tube fills until the liquid level reaches the bight of the U. As the liquid spills over the bight of the U into the descending leg, the sample is siphoned out of the receiving chamber. Due to the size and weight of the rack, such mechanisms have been fairly involved, involving an electric motor to drive the rack and complicated control means to stop and start the rack at specified filling stations. In essentially all the apparatus of this nature, the rack itself has been rotated to a liquid and dispensing station. As early as 1910, Walter Raabe of Brunswick, Germany, designed a rotatable rack for collecting and automatically testing condensing water in sugar refineries. This apparatus, (disclosed in U. S. Pat. No. 978,644), utilized a rack and pinion to operate a stop cock to deliver mutiple doses of liquid into a test tube for automatic sampling and testing. Raabe also utilized a novel cam operated tube emptying means. Other forms of apparatus designed since that date have been quite involved and expensive utilizing photoelectric cells and other sophisticated electronic equipment to automatically monitor the sampling and testing of liquid components. Nevertheless, insofar as I am aware, there has not been developed a relatively simple and inexpensive mechanism for collecting a large number of liquid samples of uniform size.

SUMMARY OF THE INVENTION

According to this invention, a stable non-rotatable test tube rack is provided and comprises a support for a large circular plate containing one or more rings of test tube openings. This rack is of rugged and economical construction. A rotatable liquid receiving and dispensing mechanism is mounted on said rack and comprises: a central vertically oriented shaft, a siphon tube for receiving and dispensing liquid samples of uniform size, a distribution tube for receiving liquid from the siphon tube and for delivering said liquid to the test tubes and a positioning and detent means for positioning and detaining said distribution tube over successive test tubes. The positioning and detent means consist of an engagement member operatively associated with said rotatable receiving and dispensing mechanism and includes an engagement member which engages with a series of pins so as to position and detain said distribution tube over successive test tubes. A novel escapement means in the form of a vertical motion means is provided which causes the engagement member to move vertically in and out of engagement with the pin means. The pin means have a spatial relation with the test tube openings. A simple power means in the form of a clock spring causes the receiving and dispensing mechanism to rotate to successive openings.

BRIEF DESCRIPTION OF THE DRAWINGS

FIG. 1 is a view in perspective illustrating the liquid sample collector of my invention.

FIG. 2 is an enlarged fragmentary perspective view illustrating the delivery tube of my invention, in sample dispensing relation with one of the test tubes in the test tube rack.

FIG. 3 is an enlarged, fragmentary view, illustrating the balance arm and the engagement member of my invention, in operative relation with the pin means.

DESCRIPTION OF THE PREFERRED EMBODIMENT

Figure 4:
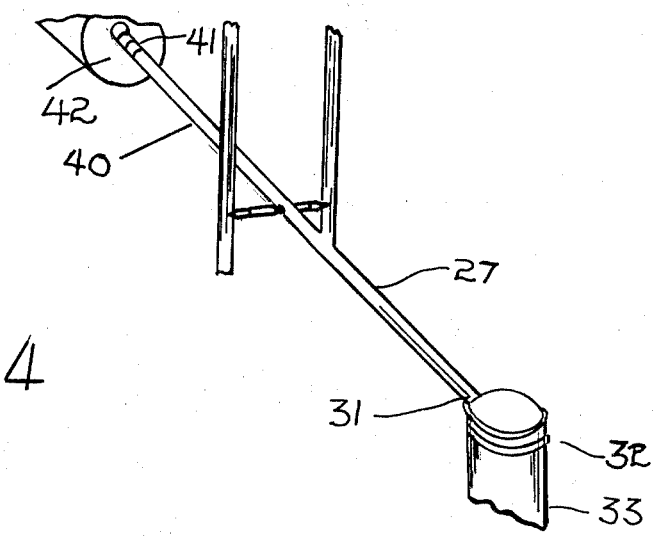
FIG. 4 is an enlarged fragmentary view of the end of the central shaft, illustrating another pivot means.

Referring now, to the drawings, the sample collector 1, consists of a stable and non-rotatable test tube rack 2, containing a ring 3, of test tube openings 4, which holds a plurality of test tubes 5. The circular plate 2, forming the test tube rack is supported by legs 6, made stable by cross braces 7. Samples are delivered sequentially to the test tubes 5, in the test tube ring 3, by means of a rotatable receiving and dispensing mechanism 10. This, in a preferred embodiment, comprises a rotatable central shaft 11, supported by an upright post 12, rotatably journaled in hub 14. The upright posts 12 are non-rotatably secured to the test tube rack 2, by means of base plates 13. The rotatable shaft 11, is journaled in ball bearings 17, contained in race 16, held in position by web 15 extending across the two upright posts 12. The central shaft is powered by means of clock spring 20, contained in spring housing 19 and secured in position by web members 18 extending across the upright posts 12.

In a preferred embodiment, the rotatable receiving and dispensing mechanism is in the form of a delivery arm and a balance arm tied together by means of cross beam 27. Cross beam 27 contains a knife edge 25 which fits into a crevice 26 in the top of the central shaft 11. Upright finger members 28, extend from the cross beam 27 to embrace a collecting receptacle 29, which terminates in an elongated laterally disposed collecting spout 30 running to the siphon tube 33. The siphon tube 33, is held in position by arms 32 extending from a bifurcation 31 at the end of the cross beam 27. The siphon tube 33 comprises a U tube which contains an ascending leg 34 and a descending leg 35 and works in known manner by delivering uniform quantities of liquid from the main body as soon as the ascending leg 34 fills with liquid and overflows the bight of the U into the descending leg 35.

The descending leg 35 is attached by a ball-joint 36 to the distribution tube 37, which, in this instance, is shown in sample dispensing relation to the test tube 5.

The other side of the cross beam 27 forms the balance arm 40, which contains a weight 42 adjustable on threads 41. A projecting finger 45, at the end of the balance arm 40, forms an engagement member which engages with a series of lower detent pins 55, and a series of upper detent pins 53.

Figure 5:
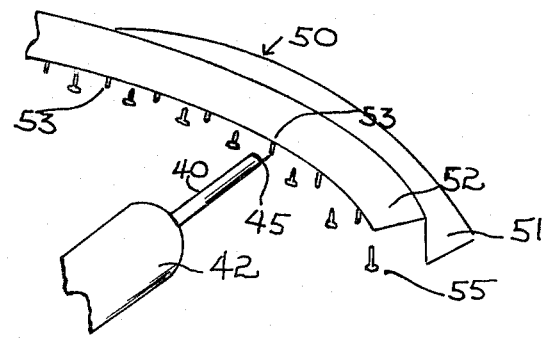
FIG. 5 is an enlarged fragmentary view in perspective illustrating the pin rail.

The lower detent pins 55 are mounted on the test tube rack 2. The upper detent pins 53, in one embodiment (illustrated in FIGS. 1–3) are the free ends of inverted hook shaped members 54 having ther shaves 56 mounted in the rack 2 and their free ends 53, depending from the bight 57 of the hook portion. In another embodiment, illustrated in FIG. 5, the upper detent pins 53 depend from the upper flange 52 of the pin rail 50. The lower flange 51 of the pin rail 50 is mounted directly to the rack.

OPERATION

As will be obvious, the central shaft 11, is rotated by means of clock spring 20. Essentially friction-less rotation is effected through the means of hub 14 and the ball bearings 17.

The adjustable weight 40 is adjusted so that the cross beam is balanced when the siphon tube is essentially half-full of liquid.

Assuming the siphon tube 33 to be empty, liquid received in the receiving receptacle 29, is delivered by the collecting spout 30 to the siphon tube 33. Since the siphon tube is empty, the balance arm is tilted or rocked downwardly so that the engagement member in the form of the projecting finger 45 is engaged with a lower pin 55. As the siphon tube fills essentially to half full the balance arm raises, raising the engagement member 45 vertically past the lower pin 55 thus allowing the arm to rotate until the engagement finger 45 engages with the upper pin 53, thus positioning the distribution tube 37 above a test tube 5. As the siphon tube becomes completely filled, the engagement member 45 is pushed upwardly so that it is now engaged with the upper pin 53. Liquid in the siphon tube has completely filled the ascending leg 34 and flows over into the bight of the U and into descending leg 35 to cause the entire sample in the siphon tube to be dispensed into the test tube 5. This loss of weight of the delivery arm of the mechanism causes the balance arm to rock downwardly out of engagement with the upper pin 53 and move therefore into engagement with the next lower pin 55. As the siphon tube 33 begins to slowly fill again, the balance arm and the two sides of the cross beam 27 become more and more balanced, until finally, the balance arm raises sufficiently to bring the engagement finger 45 out of engagement with the lower pin 55 so that the arm can rotate to engage with the next upper pin 53 at the next loading station. This operation is repeated over and over again, until the complete ring 3 of test tube 5 is completely filled. By use of the universal ball joint 36, the distribution tube can be adjusted for successive rings of test tube openings in the rack 2. Basically, the function, then is the rotation of the entire receiving and dispensing mechanism by a low energy power means such as a clock spring, The distance of travel, in each case, is only from the upper pin to the lower pin, and from the lower pin to the next successive upper pin. The spatial relation of the pins to successive test tube openings correctly positions the distribution tube over the test tubes and the vertical motion means in this case, caused by the rocking motion of the delivery arm and the dispensing arm forms an escapement means for bringing the engagement member in and out of engagement with successive pins. The two sides of the cross beam 27, are balanced by a conventional knife-edge 25 fitting in the crevice 26 in the top of the central shaft 11. FIG 4 illustrates a pivot pin for the cross beam 27 rather than the knife-edge 25.

Figure 6:
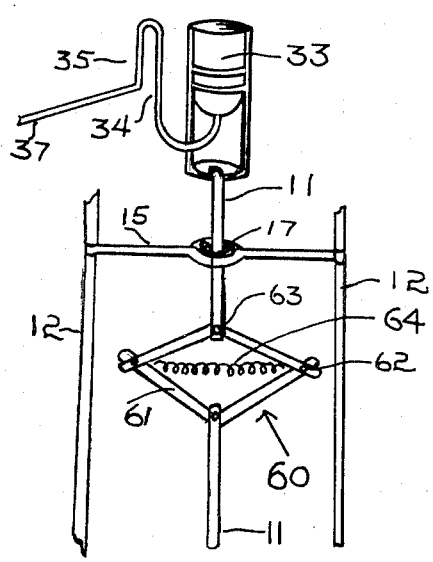
FIG. 6 is an elevational view illustrating another modification in the vertical motion means of my invention.

A modification of the vertical motion means as illustrated in FIG. 6, is accomplished by positioning the siphon tube 33 directly over the central shaft 11. The central shaft 11, is divided into upper and lower parts, for provision of a lazy tong structure 60 consisting of four rods 61, pivoted at each end across the horizontal axis at 62 and at point 63 across the vertical axis. A spring member 64, is located across the horizontal axis and tends to expand the lazy tong structure across or along the vertical axis. As liquid flows into the siphon tube 33, the weight of the liquid in the siphon tube causes the horizontal axis across pivot point 62 to expand against the tension of spring 64 until the liquid in the siphon tube fills the ascending leg and spills over into the descending leg 35 to dispense the entire sample to the awaiting test tube 5. In this instance, the delivery tube is connected directly to the descending leg 35 of the siphon tube 33. The projecting finger, not shown, is connected to the end of the delivery tube to engage with the pin means. The vertical motion results from the weight of the liquid in the siphon tube against the biasing pressure of spring 64 in the conventional lazy tong structure 60, to expand or retract either the horizontal or vertical axis of the lazy tong structure.

Figure 7:
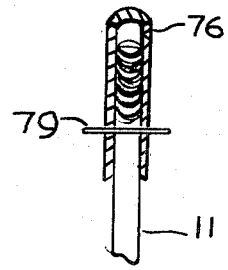
FIG. 7 is a fragmentary elevational view partially in section illustrating a spring loaded telescopic shaft serving as a vertical motion means.

It will be noted, that in FIG. 7, the spring loaded telescopic structure is provided so that a sleeve 76 fits over the central shaft 11 and allows vertical movement against spring 78 held in position by upper and lower pins 79 and 80 respectively.

Figure 8:
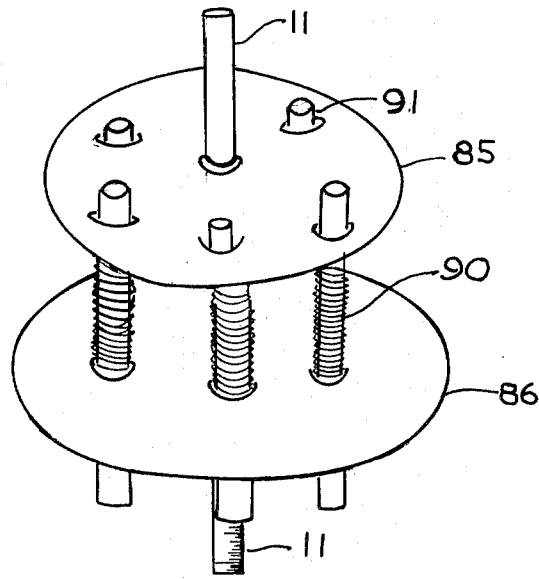
FIG. 8 is a fragmentary perspective view illustrating another modification of the vertical motion means of this invention.

In the vertical motion means, illustrated in FIG. 8, an upper plate 85, is connected to the lower part of the upper part of the central shaft 11 and a lower plate 86 is connected to the upper part of the lower part of central shaft 11. Springs 90 held in alignment by rods 91 allow a vertical movement of the plate and the upper part of the shaft connected thereto.

Figure 9:
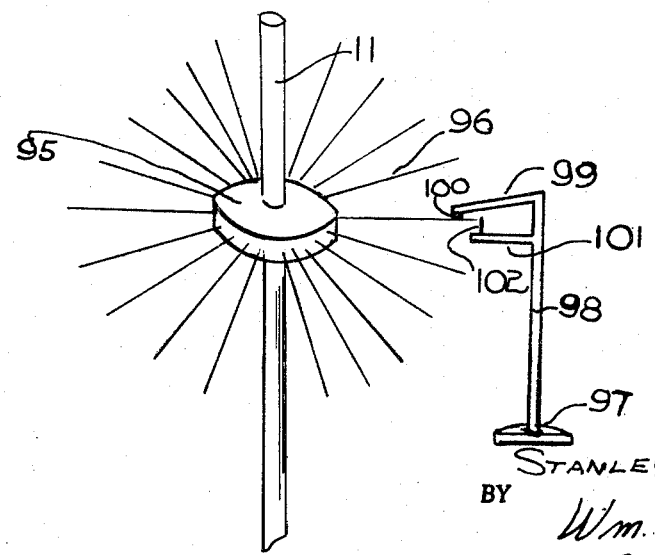
FIG. 9 is a view of another embodiment of an engagement member of this invention.

FIG. 9 illustrates an engagement member in the form of a nave 95, surrounding the central shaft 11, and containing a series of radiating spokes 96. The spokes, engage with upper pin 100 and lower pin 102, contained on a raised upright standard 98. Standard 98 is connected to the upper surface 2, of the test tube rack by base plate 97. The upper depending pin 100 is supported from upper arm 99, while the lower vertically disposed pin 102 is mounted in lower arm 101.

Many modifications will occur to those skilled in the art from the detailed description herein above given, and such description is mean to be non-limiting except as to be commensurate in scope with the appended claims.

I claim:

1. An automatic liquid sample collector, comprising:
   A. a test tube rack including a plurality of test tube openings for receiving a plurality of test tubes;

B. pin means in operative relation with said test tube rack and mounted so as to have a spatial relation to said test tube openings;

C. a rotatable liquid receiving and dispensing mechanism comprising:
  1. a central vertically oriented shaft;
  2. a delivery arm and a balance arm;
    a. said balance arm including an adjustable weight, adjustable on said balance arm so that said balance arm balances said delivey arm;
  3. a siphon tube mounted laterally from said central shaft on said delivery arm for receiving and dispensing liquid samples of uniform size;
  4. a distribution tube in operative relation to said siphon tube and forming part of said delivery arm, for receiving liquid from said siphon tube and delivering said liquid to said test tube;
  5. a positioning and detent means for positioning and detaining said distribution tube over successive test tubes, said positioning and detent means comprising;
    a. an engagement member opratively associated with said receiving and dispensing mechanism for engaging said pin means so as to position and detain said distribution tube over successive test tubes;
  6. escapement means to allow said engagement member to disengage from said pin means; comprising
    a. vertical motion means for moving said engagement means vertically out of engagement with said pin means, said vertical motion means including:
      1. a pivot point for said delivery arm and said balance arm so that variations in liquid volume in said siphon tube will cause said arms to tilt vertically; and D. power means to rotate said receiving and dispensing mechanism.

2. An automatic liquid sample collector, as defined in claim 1, in which:
A. said pivot point is a knife edge.

3. An automatic liquid sample collector, as defined in claim 1, in which:
A. said pivot point is a pin.

4. An automatic liquid sample collector, comprising:
A. a test tube rack including a plurality of test tube openings for receiving a plurality of test tubes;
B. pin means in operative relation with said test tube rack and mounted so as to have a spatial relation to said test tube opening;
C. a rotatable liquid receiving and dispensing mechanism comprising:
  1. a central vertically oriented shaft,
  2. a siphon tube for reciving and dispensing liquid samples of uniform size,
  3. a distribution tube in operative relation to said siphon tube for receiving liquid from siphon tube and delivering said liquid to said test tube;
  4. a positioning and detent means for positioning and detaining said distribution tube over successive test tubes, said positioning and detent means comprising:
    a. an engagement member opratively associated with said receiving and dispensing mechanism for engaging said pin means so as to position and detain said distribution tube over successive test tubes;
  5. escapement means to allow said engagement member to disengage from said pin means;
    a. said escapement means comprising a vertical motion means for moving said engagement means vertically out of engagement with said pin means;
      1. said vertical motion means including a lazy tong structure mounted in operative relation with said siphon tube and including a spring mounted across one of the axes of said lazy tong structure so that variations in the weight of liquid in said siphon tube will cause the lazy tong structure to expand and retract its horizontal and vertical axes;
      2. power means to rotate said receiving and dispensing mechanism.

5. An automatic liquid sample collector, as defined in claim 4, in which both said lazy tong structure and said siphon tube are mounted in direct vertical orientation and in operative relation with said central shaft.

* * * * *